United States Patent
Ausserlechner (10) Patent No.: US 11,441,888 B2
(45) Date of Patent: Sep. 13, 2022

(54) TURN COUNTER AND SENSING OF A ROTATIONAL ANGLE

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/922,714

(22) Filed: Jul. 7, 2020

(65) Prior Publication Data

US 2021/0018308 A1 Jan. 21, 2021

(30) Foreign Application Priority Data

Jul. 19, 2019 (DE) .................. 102019119670.1

(51) Int. Cl.
*G01B 7/30* (2006.01)
*G01D 5/16* (2006.01)

(52) U.S. Cl.
CPC .................. *G01B 7/30* (2013.01); *G01D 5/16* (2013.01)

(58) Field of Classification Search
CPC .................. G01D 5/12; G01D 5/14–18; G01D 5/245–2458; G01B 7/30
See application file for complete search history.

(56) References Cited

U.S. PATENT DOCUMENTS

| | | | |
|---|---|---|---|
| 8,283,914 B2 | 10/2012 | Mehnert et al. | |
| 9,851,221 B2* | 12/2017 | Lang | G01R 33/077 |
| 9,912,267 B1* | 3/2018 | Susanto | H02P 6/16 |
| 10,830,612 B2 | 11/2020 | Schott et al. | |
| 10,989,516 B2 | 4/2021 | Ausserlechner | |
| 2006/0243519 A1* | 11/2006 | Staudenmann | G01D 5/2455 180/444 |
| 2009/0196131 A1* | 8/2009 | Chen | G11B 19/28 369/44.11 |
| 2009/0211374 A1* | 8/2009 | Oike | G01L 3/104 73/862.08 |
| 2010/0060263 A1* | 3/2010 | Granig | G01D 5/145 324/202 |
| 2013/0335072 A1 | 12/2013 | Malzfeldt | |
| 2014/0148948 A1* | 5/2014 | Hagenauer | G01D 5/2073 702/116 |

(Continued)

FOREIGN PATENT DOCUMENTS

| | | | |
|---|---|---|---|
| CN | 101504857 A | 8/2009 | |
| CN | 101832789 A | 9/2010 | |

(Continued)

OTHER PUBLICATIONS

Halder, "Umdrehungszähler nutzt GMR Technologie," elektronik industrie, vol. 12, 2007, 3 pages. [Retrieved from https://www.all-electronics.de/wp-content/uploads/migrated/article-pdf/78799/ei07-12-060.pdf].

(Continued)

*Primary Examiner* — Huy Q Phan
*Assistant Examiner* — David B Frederiksen
(74) *Attorney, Agent, or Firm* — Harrity & Harrity, LLP (57) ABSTRACT

An off-axis counter is suggested that is arranged to count magnetic poles of a magnetic field source that turns around a rotation axis modulo an integer number. Also, a rotation angle sensing device and a method for determining a rotation angle are provided.

20 Claims, 3 Drawing Sheets

(56) References Cited

U.S. PATENT DOCUMENTS

| | | |
|---|---|---|
| 2014/0176125 A1 | 6/2014 | Friedrich et al. |
| 2014/0197822 A1* | 7/2014 | Ritter .................... G01D 5/145 324/207.21 |
| 2015/0137797 A1 | 5/2015 | Ausserlechner et al. |
| 2015/0153154 A1* | 6/2015 | Nishi ................... G01D 5/2451 382/203 |
| 2016/0146632 A1* | 5/2016 | Mol .................. G01D 5/24485 324/207.2 |
| 2017/0047823 A1 | 2/2017 | Sangermano, III et al. |
| 2018/0172474 A1* | 6/2018 | Ausserlechner ....... G01D 5/142 |
| 2018/0372510 A1* | 12/2018 | Mattheis .............. G01R 33/093 |
| 2019/0368894 A1* | 12/2019 | Suzuki .................. B62D 5/049 |

FOREIGN PATENT DOCUMENTS

| | | |
|---|---|---|
| CN | 104583727 A | 4/2015 |
| CN | 104656042 A | 5/2015 |
| CN | 109990697 A | 7/2019 |
| DE | 102008037975 A1 | 3/2009 |
| DE | 112012002239 T5 | 3/2014 |
| DE | 102013113584 A1 | 6/2015 |
| EP | 1 087 232 A1 | 3/2001 |

OTHER PUBLICATIONS

"Out of Shaft with magnetic 3D sensor," Firmenschrift Infineon, Infineon Technologies AG, Jul. 23, 2018, 22 pages.

Cordic, In Wikipedia, Jul. 8, 2019, 14 pages. [Retrieved from https://en.wikipedia.org/w/index.php?title=CORDIC&oldid=905347606].

Mattheis et al., "Multitum Counter Using the Movement and Storage of 180° Magnetic Domain Walls," IEEE Transactions on Magnetics, vol. 42, Issue 10, Oct. 2006, pp. 3297-3299, 3 pages.

Ausserlechner, "Closed Analytical Formulae for Multi-Pole Magnetic Rings," Progress In Electromagnetics Research B, vol. 38, 2012, pp. 71-105, 18 pages.

* cited by examiner

TURN COUNTER AND SENSING OF A ROTATIONAL ANGLE

CROSS REFERENCE TO RELATED APPLICATION

This application claims priority to German Patent Application No. 102019119670.1 filed on Jul. 19, 2019, the content of which is incorporated by reference herein in its entirety.

BACKGROUND

In many applications it is not an option to directly access the end of a shaft for angle measurement purposes. As a solution, a magnetic 3D sensor can be used by measuring the X-Y (X-Z or Y-Z) components. The sensor is located out of the shaft (also referred to as "off-axis"), e.g. not on the rotation axis of the shaft. The shaft itself has a magnetic encoder with at least two poles (one referred as N, the other as S).

OVERVIEW

Implementations described here may improve existing solutions for sensing of a rotational angle of, e.g., a shaft and in particular to be able to efficiently count turns of a rotation.

The examples suggested herein may in particular be based on at least one of the following solutions. Combinations of the following features may be utilized to reach a desired result. The features of the method could be combined with any feature(s) of the device, apparatus or system or vice versa.

An off-axis counter is provided that is arranged to count magnetic poles of a magnetic field source that turns around a rotation axis modulo an integer number.

The off-axis counter may be or be part of an off-axis angle sensor, a through-shaft angle sensor or a rotation angle sensor.

It is noted that "modulo counting" is referred to applying a modulo operation when counting: The off-axis counter (also referred to as turn counter or pole counter) has a predefined range of numbers, e.g., from 0 to a maximum value (or number) $TC_{max}-1$ and it may count from 0 (or any value $<TC_{max}$) towards $TC_{max}-1$; if the counter shows the value $TC_{max}-1$ and a subsequent magnetic pole to be counted passes by, the counter will subsequently produce the value 0, e.g. incrementing $TC_{max}-1$ results in the first value of the counting range. Hence, the turn counter counts modulo $TC_{max}$.

It is also an option that the counter counts backwards. In this case, after the value 0 comes the value $TC_{max}-1$.

The modulo operation is exemplarily abbreviated by the term "mod(a,b)", wherein a is the count value (e.g., "TC") to be counted "modulo b" (b being, e.g., the number of pole pairs P). For example: mod(4,5)=4; mod(4,4)=0; mod(4,3)=1.

The off-axis counter may in particular be used in a magnetic field angle sensing system, in particular a through-shaft magnetic angle system, wherein a magnetic field source is coupled to and rotates with the shaft. The sensing system may in addition comprise at least one sensing element (sensor) that is arranged on a circle concentric to the rotation axis (also referred to as reading circle). If several sensing elements are used, they may preferably be spaced apart from each other so that they may substantially be evenly spread across this reading circle.

At least two sensing elements may be combined together in a sensor package such that the sensor package determines two non-parallel magnetic field components. Each sensor element may be one of the following: an AMR (Anisotropic MR) sensor, a GMR (Giant MR) sensor, a TMR (Tunneling MR) sensor, a Hall plate or a vertical Hall effect device.

It may be an option that the turn counter is integrated together with one of several sensing elements, wherein this sensing element detects only a single magnetic field component. Other sensing elements may be arranged around the reading circle (as described herein) that can be used to (at least once) detect the other non-parallel magnetic field component.

In other words, it may be an option that the turn counter is located together with a magnetic sensing element that detects one of the two non-parallel magnetic field components. However, this detected magnetic field component beneficially supplies the rotating magnetic field that allows the turn counter to conduct the counting as described herein.

Also, circuitry may be provided that is coupled to the at least one sensing element and the off-axis counter and configured to provide a signal indicative of a rotational position of the magnetic field source (e.g., the ring magnet) around the rotation axis determined by combining the signals from the at least one sensing element and the off-axis counter.

The solutions described herein in particular allow for a cost-efficient approach to determine an angular position (e.g., of the shaft) with high accuracy, providing a high stability of the system at high rotation speeds and to flexibly scale the magnetic field for different diameters of the magnetic field source.

According to an implementation, the magnetic field source is capable of being mechanically coupled, in particular fixed on a shaft and the magnetic field source comprises at least one of the following:
  a permanent magnet;
  a ring magnet;
  an injection molded ferrite.

According to an implementation, the integer number is programmable.

Hence, the integer number can be set or reset after the chip comprising the counter has been manufactured. This may be achieved via a memory, e.g. an EEPROM, or via dedicated pins (of the counter or the device comprising the counter) that may be set to low or high. As an alternative, at least one resistor can be connected to a pin thereby allowing the chip to detect a resistance value and setting the integer number based on this resistance value.

According to an implementation, the magnetic field source is a multipole magnet.

The multipole magnet may in particular have a ring or donut shape and it may be mechanically coupled around a rotatable shaft, wherein the shaft turns around the rotation axis.

In case the magnetic field source comprises a dipole magnet, a full period of a single signal generated may correspond to a rotation of the shaft amounting to 360°. In case the magnetic field source comprises P pole pairs, P full periods are generated per 360°-rotation.

According to an implementation, the integer number equals an integer multiple of a number P of pole pairs of the multipole magnet.

According to an implementation, the multipole magnet is a ring-shaped magnet or a donut-shaped magnet and wherein the poles of the multipole magnet are arranged on a plane or curved surface at the bottom or top of the ring-shaped magnet.

According to an implementation, the multipole magnet is a ring-shaped magnet or donut-shaped magnet and wherein poles of the multipole magnet are arranged on the curved surface of the ring-shaped magnet.

It is noted that ring-shaped magnet or donut-shaped magnet may comprise any ring structure that has a rectangular, circular or oval profile. In addition, at least one edge of the profile may be straight or curved.

Hence, the main surface of the chip of the turn counter may be perpendicular to the radius vector for the multipole magnet with its poles on the flat surfaces. If the magnet has round or donut shape, the flat surface may instead be a round surface.

As an alternative, the main surface of the chip of the turn counter may be perpendicular to the rotation axis of the multipole magnet with its poles on the curved surfaces.

In both variants, the chip may advantageously be located in close proximity to the poles; the chip is not located on the rotation axis, but on a reading circle with radius comparable to the mean diameter of the magnet.

According to an implementation, the counter is implemented as a system on a chip or in a package, in particular adjacent to one additional sensing element.

According to an implementation, the counter is arranged on a circle concentric to the rotation axis.

According to an implementation, the counter comprises a micro-magnetic loop structure with a magnetization pattern, wherein the micro-magnetic loop structure is arranged to monitor a magnetic field projected on a main surface of the micro-magnetic loop structure.

It is noted that the magnetization pattern of the micro-magnetic loop structure is rotated by a magnetic field, in particular by an applied magnetic field of the magnetic field source.

According to an implementation, the micro-magnetic loop structure is a loop structure on a layer of an XMR device, wherein this layer of the XMR device is a free layer.

The XMR device may be a GMR (Giant MR), a TMR (Tunneling MR) or an AMR (Anisotropic MR) device.

Free layer in particular denotes a layer made of a material with a magnetization that is easily rotatable by an externally applied magnetic field. Shape anisotropy means that due to the slim form (of, e.g., the wire), the magnetization can only be directed forwards or backwards (e.g., of the wire).

The loop structure may comprise a closed loop structure (or spiral structure) without domain generator. A programming device allows adding a marker by reversing the polarity in an arm or section of the loop structure. This marker then endlessly runs around in the loop structure when agitated by the magnetic field thereby enabling the modulo counter.

It is in particular an advantage that the turn counter does not need any electric power. It does not miss any pulses even if no energy is applied.

According to an implementation, the counter comprises at least one circuitry or being part of at least one circuitry, wherein the at least one circuitry is arranged for
  converting a magnetic pattern detected by the micro-magnetic loop structure into a number,
  mapping the number to an interval that corresponds to counting modulo an integer number.

Hence, the counter may in particular comprise a micro-magnetic loop structure that is arranged such that a magnetic pattern in the loop structure may be rotated via an external magnet field supplied by the magnetic field source. The counter may further comprise a first piece of circuitry for converting the magnetic pattern into a number and for providing an electrical signal that corresponds to such number. In addition, the counter may comprise a second piece of circuitry that enables modulo counting by mapping the number to a predefined interval as explained herein.

It is noted that the modulo counter can be programmed by setting the interval. This can be done by modifying the circuitry or a part thereof.

It is an option that the micro-magnetic loop structure comprises several sub-counters and the counter is an LCM of the values counted by the sub-counters. The counter can than be programmed to a suitable value based on the values of the sub-counters.

It is noted that the first circuitry and the second circuitry may be separated or combined in a single circuitry. It is also an option that the first circuitry and/or the second circuitry are combined with another (third) piece of circuitry (relating, e.g., to the magnetic angle sensing elements or a portion of such magnetic angle sensing elements).

According to an implementation, the counter is implemented on a chip, which comprises a main surface such that rotations of a magnetic field component are counted, which is substantially parallel to the main surface.

Also, a rotation angle sensing device is provided, the device comprising
  a magnetic field source that is capable of being mechanically coupled to a rotatable shaft;
  at least one magnetic angle sensing element that is arranged to detect the magnetic field of the magnetic field source,
  wherein the at least one magnetic angle sensing element is arranged around the rotation axis, in particular on at least one plane that is perpendicular to the rotation axis,
  the off-axis counter according to any of the preceding claims.

According to an implementation, the magnetic field source is a multipole magnet.

According to an implementation, the device further comprises circuitry that is coupled to the at least one sensing element and the off-axis counter and is configured to provide a signal indicative of a rotational position of the magnetic field source around the rotation axis by combining the signals from the at least one sensing element and the off-axis counter.

Hence, magnetic fields provided by the multipole magnet (e.g., in ring or donut shape) are detected by the at least one sensing element and by the turn counter and the signals from the at least one sensing element and the turn counter are combined to determine a rotation angle (including the number of rotations).

Further, a method is suggested for determining a rotation angle utilizing a rotation angle sensing device as described herein, wherein the method comprises:
  providing a signal indicative of a rotational position of the magnetic field source around the rotation axis by combining the signals from the at least one sensing element and the off-axis counter.

Implementations are shown and illustrated with reference to the drawings. The drawings serve to illustrate the basic principle, so that only aspects necessary for understanding the basic principle are illustrated. The drawings are not to scale. In the drawings the same reference characters denote like features.

BRIEF DESCRIPTION OF THE DRAWINGS

Examples of the disclosure are described below with reference to the accompanying drawings, in which.

DETAILED DESCRIPTION

Implementations exemplarily described herein in particular refer to magnetic angle sensors. Each magnetic angle sensor may comprise at least one, advantageously several, sensor elements (also referred to as sensor chips, sensor packagers or sensors) placed around a rotating shaft with a ring magnet.

The sensors elements may be placed on a reading circle, which may be substantially concentric around the rotation axis and axially shifted by a small amount against the magnet surface. This small axial shift is referred to as clearance or airgap (AG).

The AG may preferably be as small as possible; however, it is large enough to prevent a collision of the rotating parts with the stationary sensor elements. Typically, the AG may be in a range between 1 mm and 3 mm.

The surface of the magnet facing the sensor elements does not have to be plane, it may have a relief structure. In such case a rotational position that defines the minimum clearance between the sensor package and the magnet also defines the airgap; in other words, if the size of the clearance fluctuates during the rotation, the minimum clearance may be considered as the airgap.

In the examples discussed herein, a right-handed Cartesian coordinate system (x,y,z) is used with the z-axis being identical with the rotation axis of the shaft. Radial or azimuthal positions or coordinates are defined as $$R^2 = x^2 + y^2$$

and $$\tan \psi = \frac{y}{x},$$

e.g. reference is made to a cylindrical coordinate system $(R, \psi, z)$, wherein the z-axis is identical to the rotation axis. It is noted that $\psi$ refers to an azimuthal coordinate and $\varphi$ refers to a rotation angle (e.g., of the shaft).

A number of N sensor elements (e.g., Hall plates, MAGFETs, Vertical Hall effect devices, or magneto-resistors like GMRs or TMRs or AMRs) are placed on a reading circle preferably with a regular angular spacing amounting to 360°/N, which results in the N sensor elements being substantially equally distributed across the reading circle.

For N=3, the sensor packages are placed at 0°, 120° and 240° on the reading circle (wherein the 0° position is arbitrary). For N=4, the sensor packages are placed at integer multiples of 90°. For N=5, the sensor packages are placed at integer multiples of 72°, etc. For N=2, the sensor elements may also be placed at 0° and 90°.

If the sensor elements are located at the angular positions $$\psi_i = 360° \cdot \frac{i}{N}$$

with i=0, 1, ..., N−1, the system can compute a sum $$Co + j \cdot Si = \sum_{i=0}^{N-1} B(\psi_i) \cdot e^{j \cdot \psi_i},$$

wherein the argument of this complex number represents the angular position of the shaft, e.g.

$$\psi = \arctan_2\{Co, Si\},$$

which can be computed efficiently by the known CORDIC algorithm (see, e.g., https://en.wikipedia.org/wiki/CORDIC). Details on how to compute the angular position $\psi$ are also described in US 2015/0137797 A1.

$B(\psi_i)$ is the magnetic field measured at an angular position $\psi_i$ on the reading circle and j is the imaginary number $j=\sqrt{-1}$.

The magnetic field B may be an axial magnetic field component $B_z$ or it may be some other magnetic field component (e.g. radial or azimuthal field or a field component in some other direction).

Solutions described herein in particular suggest using a multipole magnet as magnetic field source. The multipole magnet may have a ring structure, it may in particular be coupled or arranged (e.g., fixed) around a shaft, which rotates around a rotation axis.

This multipole magnet comprises a number of P pole pairs that can be distributed (arranged) across 360° of a ring. Hence, each pole of the multipole magnet has an azimuthal size amounting to $$\frac{360°}{2 \cdot P}.$$

There are P magnetic north-poles and P magnetic south-poles, which may be of equal size and they may be arranged in an alternating sequence.

The number P may be chosen such that the magnetic field is suitable for sensing elements (also referred to as magnetic field sensing elements or magnetic sensing elements).

For example, the number P may be larger than one. On the other hand, if the number P is too large, the poles become too small (for a given diameter) and the magnetic field decays too much in view of the airgap and the sensing elements may not be able to provide accurate measurements. Also, for a large number of pole pairs P the slope of the magnetic field versus the distance between the sensing elements and the magnet is huge, which results in the magnetic fields decreasing exponentially versus the airgap. As the magnetic ring structure may have mounting tolerances, the distance between stationary sensing elements and the rotating magnet surface changes during rotation. Hence, the magnet may either be eccentrically mounted or the magnet may wobble. The rotational symmetry axis of the magnet does therefore not coincide with the rotation axis, but both axes may be tilted.

As the size of the airgap is usually in the range of a few millimeter (e.g., between 1 mm and 3 mm), an example (and preferable) size of a pole may be roughly 10 mm. If the shaft has a diameter amounting to 20 mm, the magnet ring may have an inner diameter of 25 mm. The space between the 20 mm diameter and the 25 mm diameter may be used to attach the to the shaft. The magnet ring may have a radial thickness amounting to 5 mm, which results in an outer magnet diameter amounting to 35 mm. With a pole size of 10 mm at its outer diameter, this would result in 5 or 6 pole pairs (35*π/10=11).

If the shaft is thicker so that the magnet outer diameter amounts to 70 mm, twice the number of pole pairs may be used.

It is noted that magnetic poles with a size amounting to ca. 10 mm may be advantageous, because they can be manufactured with high accuracy. If the poles are significantly smaller, manufacturing accuracy may decrease. Also, the manufacturing accuracy for significantly larger pole sizes may suffer, because they may become inhomogeneous either in material composition or in magnetic properties such as remanence.

As sensing element, at least one sensing element may be placed near the ring magnet utilizing an airgap in the range between 1 mm and 3 mm. There are several approaches for placing the sensing element(s):

(1) A sensor chip may comprise two sensing elements which detect two non-parallel magnetic field components. For example, two Vertical Hall devices (VHalls) can be placed on the sensor chip such that they detect a radial $B_r$ and azimuthal $B_\psi$ magnetic field component of the ring magnet. The system can compute a rotation angle φ' based on these two magnetic field components $B_r$ and $B_\psi$ as follows:

$$\varphi'=\arctan_2(k \cdot B_r; B_\psi).$$

The factor k can be chosen to minimize differences $$\left|\frac{\varphi'}{P} - \varphi\right|,$$

wherein φ is the mechanical rotation angle of the magnet and P is the number of pole pairs of the multipole magnet.

It is noted that the rotation angle φ' may be distorted against the mechanical rotation angle φ. This distortion may be systematic and it may depend on the geometry of the magnet and its poles and/or the distance of the magnetic sensor elements from the magnet. The factor k accounts for this systematic deviation.

The sensor chip may comprise at least two sensor elements, wherein each sensor element may be one of the following: an AMR (Anisotropic MR) sensor, a GMR (Giant MR) sensor, a TMR (Tunneling MR) sensor, a Hall plate or a vertical Hall effect device.

In case saturated or strong field GMR sensors or saturated TMR sensors are used, such sensors provide the magnetic field components $B_r/B$ and $B_\psi/B$, wherein $$B=\sqrt{B_r^2+B_\psi^2}.$$

This would further lead to $$\varphi' = \arctan_2\left(k \cdot \frac{B_r}{B}; \frac{B_\psi}{B}\right).$$

In case AMR sensors are used, such sensors provide the magnetic field components $$\frac{B_r^2 - B_\psi^2}{B^2}$$

and $$\frac{2 \cdot B_r \cdot B_\psi}{B^2}$$

instead of $B_r$ and $B_\psi$. This results in a rotation angle for AMR sensors as follows:

$$\varphi'_{AMR}=2 \cdot \varphi'.$$

The factor k may then be chosen to minimize the term $$\left|\frac{\varphi'_{AMR}}{2P} - \varphi\right|.$$

(2) Several sensor chips can be arranged (substantially) equidistantly on the reading circle concentric and orthogonal to the rotation axis. For example, five chips can be placed on the reading circle at 0°, 72°, 144°, 216° and 288°. Each sensor chip may only detect a single magnetic field component, e.g., the axial component $B_z$. This could be achieved, e.g., by a Hall-plate.

As explained above, the signals of these chips can be combined to provide the CO-signal and the SI-signal and the rotation angle φ' may be computed as follows:

$$\varphi'=\arctan_2\{k \cdot Co, Si\}.$$

For example, k may typically be close to or identical to 1.

In both versions (1) and (2) the sensor chips output an angle φ' that runs P times from 0° to 360° when the multipole magnet rotates by 360°.

Therefore, the system has a P-fold ambiguity: it cannot discriminate an angle A from an angle A+360°/P or from an angle A+2*360°/P or from an angle A*(P−1)*360°/P. In some use case scenarios this ambiguity may be irrelevant (e.g., if the angle sensor is used to control a brushless DC motor with P pole pairs). However, in many other scenarios, the angle A needs to be distinguished from the angle A*(P−1)*360°/P. This may be achieved according to the following approach.

It is noted that the P-fold periodicity of the multipole magnet reduces errors of the magnetic sensing elements by a factor of P: if each of the magnetic sensing elements has an angle error of 1° in the rotation angle φ', the system determines φ'/P to derive the mechanical angle φ and this implicitly reduces the overall angle error to 1°/P. Hence, it is advantageous that the size of the poles is reduced (without impairing their manufacturing accuracy).

Examples described herein are a so-called turn counter (also referred to as magnetic turn counter or pole counter or counter). This turn counter may be realized as a micromagnetic system on a chip in a package placed on or close to the reading circle. The turn counter may in particular be arranged to count the number of poles passing its vicinity. The turn counter may advantageously be combined with the other sensing elements as described above.

The turn counter may in particular count the same poles of the multipole magnet as the magnetic angle sensors use for sensing the rotation angle φ'. In other words, the turn counter may count only N-poles or only S-poles or any combination thereof.

Hereinafter, it is exemplarily assumed that the turn counter counts N-poles.

Advantageously, the turn counter may be or it may comprise a GMR device that monitors the magnetic field projected to the main surface of its chip. The GMR device does not need electric power for excitation purposes. In an example implementation, the turn counter may be a spiral shape of the free layer of the GMR device and a domain generator at one end of the spiral.

The device comprises a thin spiral of a magnetizable material (also referred to as loop structure). The spiral has a wire that allows to become magnetized only alongside the wire, e.g. either forwards or backwards. This direction (forwards or backwards) is able to code one bit. The domain generator may be realized as a disc-shaped area (or any surface area), in which the magnetization can be easily rotated in any direction via an externally applied magnetic field. The domain generator may be coupled to the spiral: when the external magnetic field has been further rotated, the magnetic field rotates the magnetization in the domain generator coherently while the domains in the slim spiral remain unaffected. Finally, reaching 180° the magnetic moments in the domain generator are in opposite direction compared to the first section of the slim spiral structure. Then the domain generator pulls on the magnetization in this section of the spiral until it finally toggles its polarity. Domains (sections) that are further inside the spiral, which are decoupled from the first section by pronounced bends, remain unaffected. Thus, the domain generator has injected a new domain into the spiral.

Whenever an in-plane magnetic field of sufficient strength turns by 360° this pulls magnetic domains along the spiral by a predefined distance. The location of these magnetic domains along the spiral can be read out by magnetic field sensing elements, which need electric energy to conduct such reading process. Hence, the turn counter may count without power, but it may use power to be read out.

This is in particular advantageous, because such turn counter does not miss pulses even in the absence of electrical power. The system after being powered up may thus be able to read out the status of the turn counter and become aware of the relevant P multipoles.

Hence, the system is able to compute a rotation angle $\varphi''$, which also indicates the number of pole pairs passed as follows:

$$\varphi'' = \varphi' + TC \cdot \frac{360°}{P}.$$

It is noted that TC indicates the value (status) supplied by the turn counter and the rotation angle $\varphi'$ is determined by the sensor elements as described above.

Advantageously, a magnetic field of a particular strength is applied to the turn counter. For example, a magnetic field amounting to at least 18 mT and not exceeding 44 mT may be an example setup. This magnetic field strength range is compatible with the magnetic field generated by the multipole magnets as discussed herein.

Also, the turn counter may have a range of values, e.g., from 0 to $TC_{max}-1$. Hence, the turn counter counts from 0 to $TC_{max}-1$; if the turn counter reaches the value $TC_{max}-1$ and the field revolves further in the same direction, the turn counter will then show the value 0. Hence, the turn counter counts "modulo $TC_{max}$".

It is noted that in some applications, the turn counter may count in forward and/or backward direction(s). In case of the backward counting, $TC_{max}-1$ follows the value 0.

The value $TC_{max}$ may preferably be a multiple integer of the number of pole pairs P. According to an example implementation, the number $TC_{max}$ equals the number of the pole pairs P. As an option, the following may apply:

$$TC_{max} = i \cdot P$$

with i=1, 2, 3, . . . , n being non-negative integers.

Hence, the system may determine the rotation angle as follows:

$$\varphi'' = \varphi' + \mathrm{mod}(TC, P) \cdot \frac{360°}{P},$$

wherein mod(TC,P) indicates P subtracted from TC so many times that the result is in the closed interval [0,P−1].

In an example implementation, the turn counter counts rotations of the magnetic field component, which is in parallel to the main surface of the chip.

It is an option that the number of pole pairs P may vary from the values $TC_{max}$ to be counted by the turn counter. The number of pole pairs in such scenario may be determined as follow:

$$P = \mathrm{trunc}\left(\frac{1}{2} \cdot \pi \cdot \frac{Do}{Pz}\right),$$

wherein
trunc ( ) cuts off the decimal digits,
Do is the outer diameter of the magnet (ring),
Pz is the pole size of a single pole of the magnet, e.g., 3 mm, 5 mm or 7 mm.

Depending on the manufacturing process of the magnet, there may be a preferred pole size of highest accuracy. This results in a given Pz. The outer diameter Do results from the respective use case scenario. This allows determining the number of pole pairs P according to the formula above.

In real world scenarios, the number P may vary between 10 and 25. It is an option that several turn counters are provided and the outputs from these turn counters are combined. Preferably, each such turn counter uses a different number $TC_{max}$.

There are in particular two possibilities for the turn counter to count rotations of the magnetic field component, which is parallel to the main surface of the chip: The poles of the multipole magnet may be on the plane surface (top or bottom) of the magnet or the poles of the multipole magnet may be on the curved surface of the (inner or outer) ring of the magnet.

Figure 1:
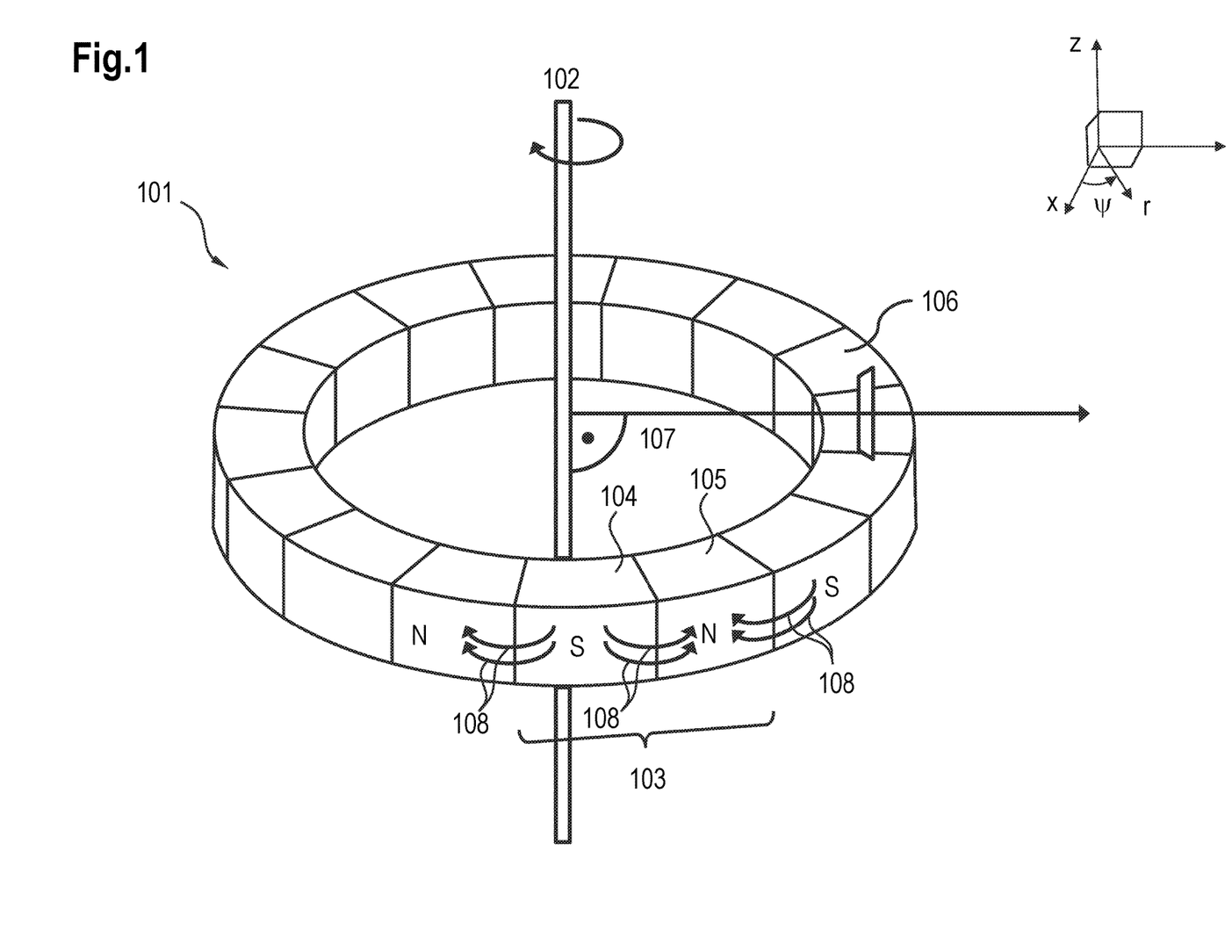
FIG. 1 shows an example arrangement for a turn counter.

FIG. 1 shows an example arrangement for a turn counter. The arrangement comprises a multipole magnet 101 that may be arranged on or mechanically coupled to a shaft (not shown) to rotate around a rotation axis 102. The rotation axis 102 runs in z-direction.

It is noted that additional sensing elements to determine the rotation angle $\varphi'$ are not shown in FIG. 1. However, these may be arranged in addition to the turn counter.

Arrows 108 show a magnetization vector field inside the multipole magnet 101. These field lines are mainly parallel to the ($\psi$,z)-plane (e.g., they are basically orthogonal to the radial direction).

The multipole magnet 101 comprises segments, each of the segments being a pole pair 103. Each pole pair 103 comprises an S-pole 104 and an N-pole 105. A turn counter 106 may be realized as a chip, wherein the chip or an effective surface of the chip is arranged perpendicular to a radial direction 107 (r-direction). This guarantees a magnetic field component parallel to the chip surface, which rotates 360° when one pole-pair passes the chip.

In FIG. 1 the S-poles 104 and N-poles 105 of the multipole magnet 101 are located on the upper plane surface of the multipole magnet 101. The turn counter 106 detects the magnetic field component in z-direction $B_z$ and the azimuthal magnetic field component $B_\psi$ of the multipole magnet 101 and is arranged to modulo-count the number of passing S-N-poles around the rotation axis 102 via magnet field projections:

$$B_\psi \cdot \vec{n}_\psi + B_z \cdot \vec{n}_z.$$

In this case, the turn counter 106 may be realized preferably as a leaded package.

Figure 2:
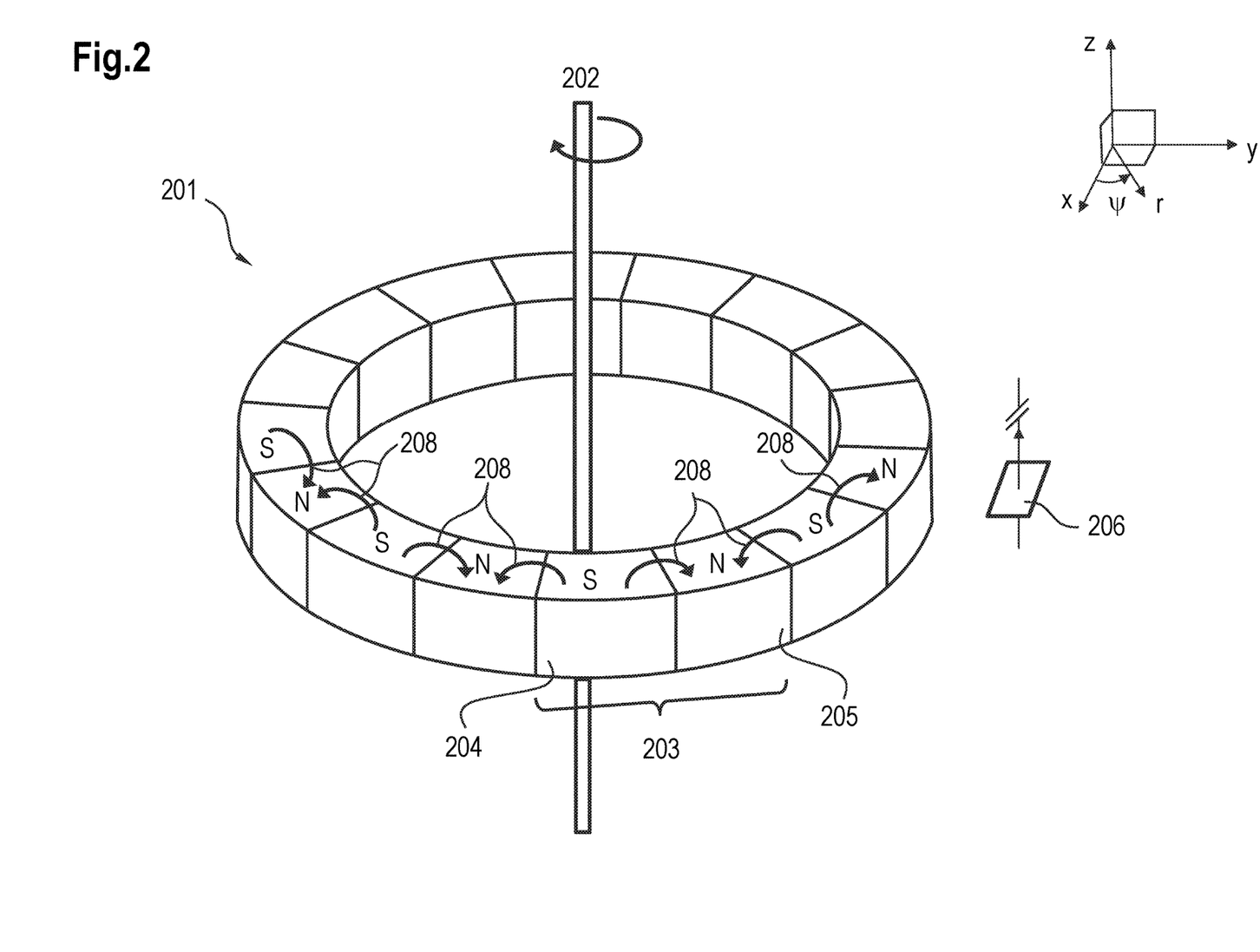
FIG. 2 shows an alternative arrangement for a turn counter.

FIG. 2 shows an alternative arrangement comprising a multipole magnet 201 that may be arranged on or mechanically coupled to a shaft (not shown) to rotate around a rotation axis 202. The rotation 202 axis runs in z-direction.

Arrows 208 show a magnetization vector field inside the multipole magnet 201. These field lines are mainly orthogonal to the z-axis.

The multipole magnet 201 comprises segments, each of which being a pole pair 203. Each pole pair 203 comprises a S-pole 204 and a N-pole 205. A turn counter 206 may be realized as a chip, wherein the poles of the multipole magnet 201 are arranged on the curved surface of the outer ring (e.g. the outer surface) of the multipole magnet 201. The effective surface of the chip is arranged perpendicular to the rotation axis 202. This guarantees a magnetic field component parallel to the chip surface, which rotates 360° when one pole-pair passes the chip.

In FIG. 2 the S-poles 204 and N-poles 205 of the multipole magnet 201 are located on the outer surface of the multipole magnet 201. The turn counter 206 detects the radial magnetic field component $B_r$ and the azimuthal magnetic field component $B_\psi$ of the multipole magnet 201 and is arranged to count rotations of the magnetic field on the chip surface that is based on the passing S-N-poles:

$$B_\psi \cdot \vec{n}_\psi + B_r \cdot \vec{n}_r.$$

In this case, the turn counter 206 may be realized as an SMD (surface mounted device).

Figure 3:
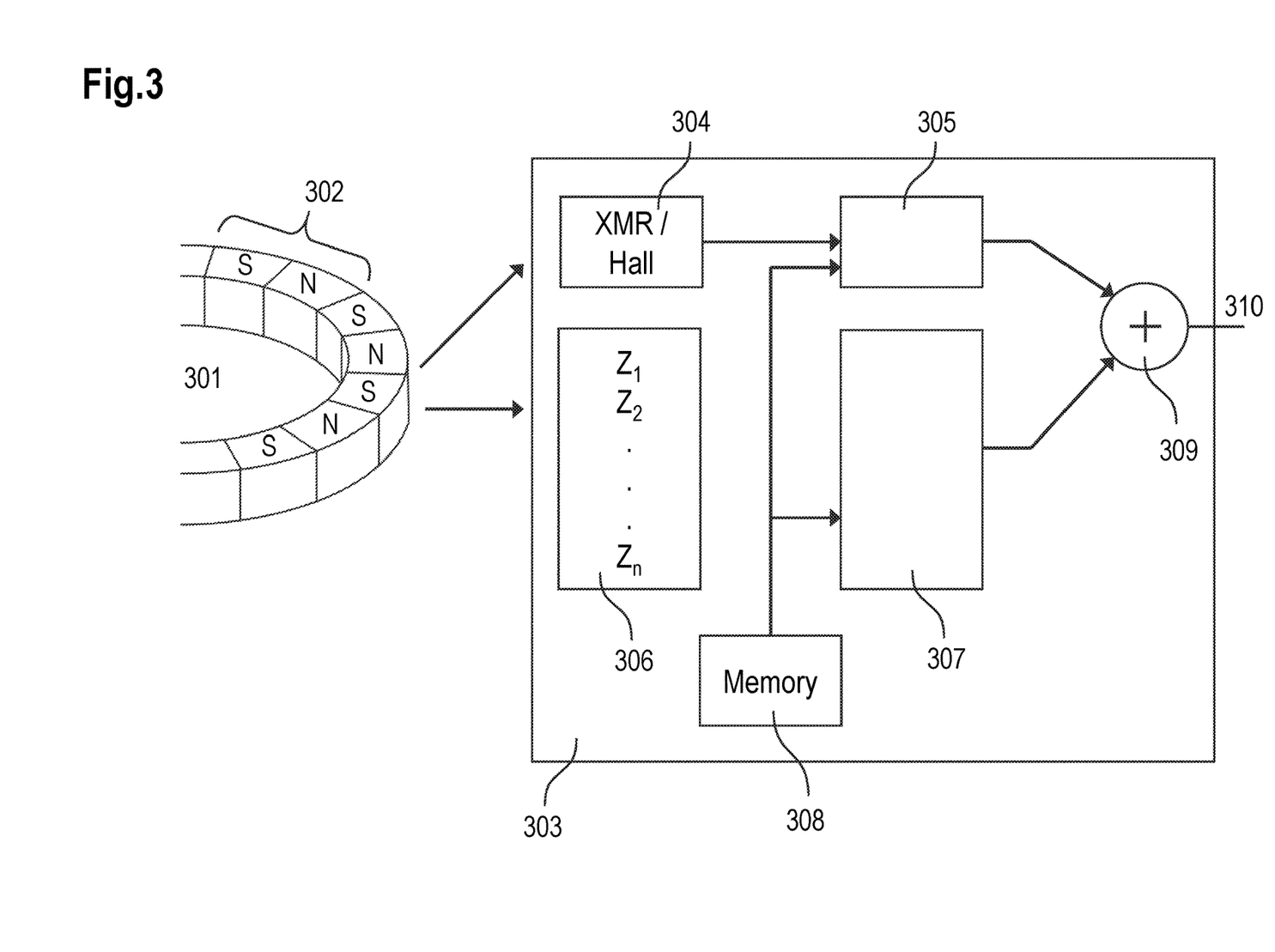
FIG. 3 shows an example diagram to determine a rotational position based on signals provided by sensing elements and a turn counter 306.

FIG. 3 shows an example diagram comprising a multipole magnet 301 with several pole pairs 302. The multipole magnet 301 generates a magnetic field that affects sensing elements 304 (which may comprise at least one, in particular at least two sensing elements, e.g., XMR or Hall devices) as well as a turn counter 306. The sensing elements supply the rotation angle φ'.

In addition, the turn counter 306 may comprise several sub-counters, each of which being a turn-counter with a different value $TC_{max}$, e.g. a different counting range. This allows covering a large counting range by utilizing different sub-counters, wherein the large counting range is the least common multiple (LCM) of the counting ranges of the selected sub-counters.

Advantageously, the sensing elements 304 and the turn counter 306 may be located adjacent to each other, preferably on the same chip or at least within the same housing or package. This may in particular apply for a selection of sensing elements if these sensing elements are deployed across the reading circle around the shaft. In this regard, FIG. 3 exemplarily shows a housing 303.

In addition, a memory 308 may be located also in the housing 303. The memory 308 may be used to store the number P of pole pairs of the magnet 301. This number may be necessary in the computation of mod(TC,P) as explained above.

The sensing elements 304 supply the XMR angle (also referred to as rotation angle φ') to a processing unit 305. Also, the number P of pole pairs is supplied to the processing unit 305 from the memory 308 (or read from the memory 308 by the processing unit 305). The processing unit 305 generates the information $$\varphi' = \frac{\text{XMR\_angle}}{P}.$$

The output of the turn counter 306 as well as the number P of pole pairs (from the memory) is supplied to a processing unit 307, which determines the information $$\text{mod}(TC, P) \cdot \frac{360°}{P},$$

as described above.

Depending on the number P, more than one counter may be used and the results of these several counters may be combined.

A combination unit 309 thus determines the rotation angle φ" based on the output from the processing unit 305 and the processing unit 307 as follows:

$$\varphi'' = \frac{XMR - \text{angle}}{P} + \text{mod}(TC, P) \cdot \frac{360°}{P}.$$

Implementation with AMR-Angle Sensor:

As an option, Anisotropic Magneto-Resistors (AMR) may be used as magnetic angle sensors. AMRs show different resistance when the magnetization of the free layer (typically Permalloy) changes its alignment with respect to the current flow lines. The magnetization rotates according to the applied field from the multipole ring magnet. In contrast to other XMRs like GMR or TMR, AMRs have a cos(2α) dependence, where α is an angle between the Permalloy magnetization and the current flow lines.

Hence, the AMR angle sensors output 360° if the multipole magnet rotates only by one pole, and they output 720° if the multipole magnet rotates by a pole pair. In other words, AMR angle sensors output 2*P rotations for a single rotation of the multipole magnet, whereas GMRs, TMRs, and Hall-sensors output only P rotations for a single rotation of the multipole (with P being the number of pole pairs of the multipole magnet).

Therefore, such 2P-fold ambiguity can be addressed by utilizing turn counters, which count poles, irrespective if they are N-poles or S-poles. In other words: Using AMRs may require for turn counters, which count each half-revolution(180°) of the applied magnetic in-plane field.

In an example implementation, such AMR-sensor compatible turn counter may comprise two turn counters, which only count full revolutions of the applied magnetic in-plane field, but these two turn counters $TC_1$ and $TC_2$ may be displaced by an odd number of poles along the reading circle. Hence, the rotation angle can be computes as follows:

$$\varphi'' = \varphi' + \mathrm{mod}(TC_1 + TC_2, 2P) \cdot \frac{180°}{P},$$

wherein both turn counters $TC_1$ and $TC_2$ count modulo P or an integer multiples thereof (as described above).

FURTHER EXAMPLES AND IMPLEMENTATIONS

Advantageously, a turn counter can be implemented with P pole pairs counting modulo integer multiples of P. For example, if P=6, the turn counter counts modulo 6 and it may be used for multipole magnets with 2, 3 or 6 pole pairs.

There exist a large variety of shaft diameters ranging, e.g., from 4 mm to 40 mm. This results in outer diameters of the magnets ranging from 8 mm to 50 mm. On the other hand, the pole sizes may not vary by a factor amounting to 50/8, because this may result in small poles for magnets with small diameter and huge poles for magnets with large diameter. However, if the poles are small, manufacturing efforts increase resulting in higher costs and the magnitude of the magnetic field emerging from the poles decreases exponentially versus the airgap (e.g. versus the distance normal to the surface of the magnet).

Hence, a small pole provides a weak magnetic field on a sensor that is located at a fixed airgap. The airgap may comprise the sum of clearance and protective coating (second level packaging of the module and first level package of the sensor element itself) in case the sensor chip is oriented in such a way that the airgap distance is normal to the main chip surface.

In many cases the airgap distance may be parallel to the main chip surface. In such scenarios, the airgap is further increased by a lateral distance and a lateral size of the sensitive elements on the chip. For example, a seal-ring around the active chip area and a kerf for sawing out the chip from the wafer may be present. Also, the active devices of the turn counter may be of a certain size amounting to, e.g., 400 μm. Hence, the active volume of the turn counter may be around 2 mm to 3 mm off the magnet (due to the airgap). In some cases (e.g., small magnet diameters, small shaft diameters) this may be reduced to a size of 0.5 mm, in other cases it may even result in a size amounting to 6 mm. Therefore, the poles may advantageously be of similar size, e.g., roughly 5 mm. In a common use case, there may be many systems with different numbers of pole pairs P. Hence, a sensor chip may advantageously be sufficiently versatile to be used with various number of P pole pairs.

To meet this demand, several loops (also referred to as loop structures) may be provided. A first loop may be used to count P=2 pole pairs, a second loop may be used to count P=3 pole pairs, a third loop may be used to count P=4 pole pairs, etc. In such scenario, the system may comprise a programmable memory (e.g., an EEPROM), which allows selecting the counting loop that matches the number of pole pairs of the magnet. Hence, all loops except for the one selected are inactive.

As an alternative, a turn counter may be provided that comprises several loops. The turn counter then counts a large number which is the least common multiple (LCM) of $n_1$, $n_2$, $n_3$, wherein $n_1$, $n_2$, $n_3$, ..., $n_1$ are different numbers of pole pairs.

For example, $n_1=2$, $n_2=3$ and $n_3=4$. The LCM in this example amounts to 12. Hence, the turn counter is able to count multipole magnets with 2, 3, 4, 6 or 12 pole pairs.

In this scenario, the system may comprise a programmable memory (e.g., an EEPROM) to store the actual number P of pole pairs, because the value "mod(TC,P)" is to be computed to determine the rotation angle (as explained above).

An example for a turn counter that counts modulo 12 and a multi pole magnet comprising P=6 pole pairs may be as follows: Initially, the turn counter may be set to TC=0. After the magnet has revolved once, the turn counter shows TC=6. The next passing pole results in the turn counter to be incremented (TC=7). However, the system computes the number or counts TC modulo 6, e.g.

mod(*TC*,*P*)=mod(7,6)=1.

Hence, the system shows the angle value as for TC=1. Hence, the turn counter works for this multipole magnet with P=6 pole pairs although its overflow does not match the number P; in fact, the overflow 12 is twice the number of pole pairs.

When the magnet rotates further the turn counter will produce TC values 8, 9, 10, 11 and 12, e.g. after the magnet has finished the second full rotation the counter will then again start with TC=0.

It is thus advantageous that a memory is provided (e.g., on-board or separately) for the turn counter as well as means to write and read such memory.

In an example implementation, the turn counter as well as the memory may share the same package or housing. It is an option that the processing means to compute "mod(TC,P)" is also part of this package or housing. This bears the advantage that wiring efforts and therefore costs can be reduced.

In is another option that the turn counter and the magnetic angle sensor are located in the same package or housing, in particular adjacent (preferably as close as possible) to each other.

The angle resolution increases with an increasing number of pole pairs P, e.g. with smaller pole sizes. On the other hand, smaller pole sizes deteriorate the uniformity of the magnetic fields. A correlation between magnetic angle sensor and turn counter may be important, because the system has to be aware of the angular offset between both. In an ideal scenario, the same magnetic field may impact the magnetic angle sensor as well as the turn counter. This can (nearly) be achieved if the magnetic angle sensor and the turn counter are in close vicinity to each other. The spacing between both may be less than the size of a single pole. Exemplarily, this spacing may be less than 1 mm.

However, larger spacings between the magnetic angle sensor and the turn counter can be compensated, e.g., by shifting the magnetic angle sensor against the turn counter by the size of one pole. In such case, there will be a north pole in front of the magnetic angle sensor whenever there is a south pole in front of the turn counter, which results in the fields on both elements are phase-shifted by 180°.

It is another option that the magnetic angle sensor may comprise means to detect the strength of the magnetic field. An example for such means is based on auxiliary signal channels which allow detecting a "magnet lost" condition. Another example for such means is a Hall-sensor part of the angle sensor which directly measures the strength of the magnetic field.

Hence, if the turn counter is closely spaced to the magnetic angle sensor, the magnetic angle sensor is enabled to detect or measure the strength of the magnetic field and to determine that the magnetic field is within an allowed range. This allowed range may apply for both the magnetic angle sensor and the turn counter. This option improves the reliability of the system.

There are various possibilities to place both the magnetic angle sensor and the turn counter in close proximity to each other. For example, the turn counter may be located on a dedicated chip and the magnetic angle sensor may be placed on different dedicated chip. Both chips may be placed side by side on a die paddle of a lead-frame or they can be placed back to back with the die paddle located in-between them (one chip is face-up on the upper side of the die paddle and the other one is face-down on the lower side). Also, both chips can be stacked in such a way that the larger one is glued to the die paddle and the smaller one is glued to the top of the larger one, wherein both chips point face up. As an alternative, the turn counter may be implemented on the same chip as the magnetic angle sensor (both may share one chip or die). In this scenario, both chips share the (substantially) same z-coordinate (z being perpendicular to the chip). In addition, the chips may be placed side by side or they may be arranged in a nested way (e.g., the loops of the turn counter may circulate the magnetic field sensitive elements of the magnetic angle sensor). In such scenario, the turn counter and the magnetic angle sensor have coinciding gravity centers.

Placing the turn counter and the magnetic angle sensor on the same chip also bears the advantage that space can be saved that would otherwise be needed for bond pads.

Although various example implementations of the implementation have been disclosed, it will be apparent to those skilled in the art that various changes and modifications can be made which will achieve some of the advantages of the implementation without departing from the spirit and scope of the implementation. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the implementation may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A device comprising:
an off-axis counter configured to count magnetic poles of a magnetic field source that turns around a rotation axis modulo an integer number,
wherein the integer number equals a multiple of a number of pole pairs of the magnetic field source,
wherein the number of pole pairs is a first number, and
wherein the off-axis counter comprises at least one circuitry configured to:
convert a detected magnetic pattern to a second number, and
map the second number to an interval that corresponds to counting modulo the integer number.

2. The device according to claim 1, wherein the magnetic field source is mechanically fixed on a shaft and the magnetic field source comprises at least one of:

a permanent magnet;
a ring magnet; or
an injection molded ferrite.

3. The device according to claim 1, wherein the integer number is programmable.

4. The device according to claim 1, wherein the magnetic field source is a multipole magnet.

5. The device according to claim 4, wherein the integer number equals an integer multiple of a number P of pole pairs of the multipole magnet.

6. The device according to claim 4, wherein the multipole magnet is a ring-shaped magnet or a donut-shaped magnet, and
wherein the magnetic poles of the multipole magnet are arranged on a plane, a curved surface at a bottom, or a top of at least one of: the ring-shaped magnet or the donut-shaped magnet.

7. The device according to claim 4, wherein the multipole magnet is a ring-shaped magnet or a donut-shaped magnet, and
wherein poles of the multipole magnet are arranged on a curved surface of the ring-shaped magnet or the donut-shaped magnet.

8. The device according to claim 1, wherein the off-axis counter is implemented as a system on a chip or in a package adjacent to an additional sensing element.

9. The device according to claim 1, wherein the off-axis counter is arranged on a circle concentric to the rotation axis.

10. The device according to claim 1, wherein the off-axis counter comprises a micro-magnetic loop structure with a magnetization pattern, and
wherein the micro-magnetic loop structure is arranged to monitor a magnetic field projected on a main surface of the micro-magnetic loop structure.

11. The device according to claim 10, wherein the micro-magnetic loop structure is a loop structure on a layer of a magneto-resistor (XMR) device, wherein the layer of the XMR device is a free layer.

12. The device according to claim 10, wherein the detected magnetic pattern is detected by the micro-magnetic loop structure.

13. The device according to claim 1, wherein the off-axis counter is implemented on a chip, which comprises a main surface such that rotations of a magnetic field component are counted, which is substantially parallel to the main surface.

14. A rotation angle sensing device comprising:
a magnetic field source that is mechanically couplable to a rotatable shaft;
at least one magnetic angle sensing element that is configured to detect a magnetic field of the magnetic field source,
wherein the at least one magnetic angle sensing element is arranged around a rotation axis on at least one plane that is perpendicular to the rotation axis;
an off-axis counter configured to count magnetic poles of the magnetic field source that turns around the rotation axis modulo an integer number,
wherein the integer number equals a multiple of a number of pole pairs of the magnetic field source,
wherein the number of pole pairs is a first number, and
wherein the off-axis counter comprises at least one circuitry configured to:
convert a detected magnetic pattern to a second number, and
map the second number to an interval that corresponds to counting modulo the integer number.

15. The rotation angle sensing device according to claim 14, wherein the magnetic field source is a multipole magnet.

16. The rotation angle sensing device according to claim 14, further comprising:
   circuitry that is coupled to the at least one sensing element and the off-axis counter, and is configured to provide a signal indicative of a rotational position of the magnetic field source around the rotation axis by combining signals from the at least one sensing element and the off-axis counter.

17. A method for determining a rotation angle utilizing a rotation angle sensing device according to claim 14, wherein the method comprises:
   providing a signal indicative of a rotational position of the magnetic field source around the rotation axis by combining signals from the at least one sensing element and the off-axis counter.

18. The rotation angle sensing device according to claim 14, wherein the detected magnetic pattern is detected by a micro-magnetic loop structure.

19. The rotation angle sensing device according to claim 18, wherein the micro-magnetic loop structure is a loop structure on a layer of a magneto-resistor (XMR) device, wherein the layer of the XMR device is a free layer.

20. The rotation angle sensing device according to claim 14, wherein the off-axis counter comprises a micro-magnetic loop structure with a magnetization pattern, and
   wherein the micro-magnetic loop structure is arranged to monitor a magnetic field projected on a main surface of the micro-magnetic loop structure.

* * * * *